Patented Apr. 29, 1930

1,756,267

UNITED STATES PATENT OFFICE

HAROLD F. WAKEFIELD, OF NEWARK, NEW JERSEY, ASSIGNOR TO BAKELITE CORPORATION, OF NEW YORK, N. Y., A CORPORATION OF DELAWARE

VARNISH OR LACQUER AND METHOD OF PREPARING THE SAME

No Drawing. Application filed February 24, 1927, Serial No. 170,750. Renewed May 19, 1928.

The object of this invention is to provide a novel varnish or lacquer of the phenol-aldehyde condensation product type, characterized by superior resistance of the air-dried film to the action of solvents; by rapid convertibility of the film under the action of heat into the insoluble and infusible resinoid modification; and by a characteristic non-penetrating quality which is of value in certain applications where an essentially superficial coating of a porous or absorbent substance such as paper, cloth, wood or the like is desired as distinguished from an impregnation of the body of the sheet or article.

Varnishes and lacquers of the phenol-aldehyde type are commonly prepared by dissolving a reactive phenolic resin in an appropriate solvent or solvent mixture. These phenolic resins in their initial or reactive state resemble the natural resins in respect to solubility, forming solutions with alcoholic and other solvents and mixtures of solvents, and these solutions have a certain penetrative quality comparable with that of solutions of natural resins in the same solvents. In contradistinction to this I prepare varnishes and lacquers in which the resin component exists at least partly in a state of colloid suspension. The particles, while of colloidal dimensions and hence indefinitely suspensible in the liquid vehicle, are nevertheless relatively large as compared with those existing in the solutions of the reactive resins, and it is to this fact that I attribute the non-penetrating quality of these varnishes and lacquers.

Following is a preferred procedure in accordance with my invention, although the invention is not restricted to the particular materials, proportions or manipulations cited by way of illustration.

A reactive resin of the phenol-aldehyde type, dissolved in alcohol, acetone, turpentine or other appropriate solvent or mixture of solvents, is heated until gelatinization sets in. While not limited thereto, I prefer to use such phenol-oil-methylene resins as are described in United States Patent No. 1,590,079 granted June 22, 1926 to Lawrence Byck. The gelatinization is due to advancement of the reaction toward the infusible and insoluble "resinoid" stage, and for convenience the resin may be described as in the "B" condition, intermediate between the initial or "A" state of the fully soluble reactive resin, and the final "C" or infusible and insoluble "resinoid" condition of the baked film. In this intermediate condition the resin is gelatinous in presence of solvents, incompletely soluble therein, and infusible although softened by moderate heating. The "B" condition above mentioned is not a fixed composition but a transition state which is conveniently regarded as consisting of a mixture, in varying proportions, of reactive resinoid and fully transformed (insoluble and infusible) resinoid, the properties of this mixture changing progressively as it approaches the resinoid C state.

The gelatinous resin-solvent mixture is transferred to a kneading apparatus or equivalent mechanical device, and when a lacquer is to be prepared, is thoroughly masticated with amyl acetate or other suitable lacquer solvent until a homogeneous creamy or liquid suspension is formed. This is then passed through a colloid mill, or equivalent device for obtaining extreme mechanical disintegration, to effect the thorough disintegration of the particles and to reduce them to colloidal dimensions. The resulting lacquer may be thinned if desired and is ready for use. Despite the fact that the resin particles exist at least partly in a state of colloid suspension or dispersion as distinguished from true solution, it is found that the varnishes and lacquers thus prepared yield substantially continuous films, the minute particles apparently coalescing during the drying or baking of the film. The conversion into the final or resinoid state is more rapid than in the case of the usual varnishes of the reactive resin type, owing to the fact that the reaction is already well advanced before the film is formed; and for the same reason the film before baking is more resistant to solvents.

Varnishes are prepared by the same procedure as has been described above for lacquers, with corresponding modification in the choice of solvents.

Considerable latitude is permissible with respect to the degree to which the reaction is advanced before the resin-solvent mixture is sent through the colloid mill, the essential conditions being on the one hand that it should be so far advanced as to afford colloidal suspensions as distinguished from the true solutions of the reactive resins; and on the other hand that the reaction should not be carried to the final resinoid condition or such near approximation thereto as will prevent the particles from coalescing into a satisfactorily continuous film.

Varnishes and lacquers prepared as above may be applied to any of the purposes for which solutions of the phenol-aldehide resins are used in the arts: for example, for the manufacture of molding mixtures and laminated products: for the coating of metallic, cloth, paper and other surfaces, or the like.

I claim:

1. Method of preparing non-penetrative varnishes and lacquers from reactive resins of the phenol-aldehyde type, comprising effecting a partial transformation of the reactive resin to the insoluble resinoid modification by application of heat, commingling it with a solvent for the reactive component, and mechanically converting the mixture into a colloidal dispersion.

2. A non-penetrative resin composition comprising a liquid capable of dissolving a reactive resin, and an insoluble resinoid of the phenol-aldehyde type colloidally dispersed in said liquid.

In testimony whereof, I affix my signature.

HAROLD F. WAKEFIELD.